United States Patent [19]

Shannon

[11] 4,360,753
[45] Nov. 23, 1982

[54] MOTOR HAVING CONCENTRIC RING ROTOR

[76] Inventor: E. Paul Shannon, Rte. 2, Box 249, Killen, Ala. 35645

[21] Appl. No.: 147,855

[22] Filed: May 8, 1980

[51] Int. Cl.³ .............................................. H02K 49/00
[52] U.S. Cl. ..................................... 310/93; 310/108; 310/163
[58] Field of Search .............................. 310/162–165, 310/46, 103, 105, 107, 108, 92, 93

[56] References Cited

U.S. PATENT DOCUMENTS

1,844,322  2/1932  Gölz ................................... 310/108
1,946,289  2/1934  Lilienthal et al. ................... 310/163
3,576,455  4/1971  Ingenito ............................. 310/46 X
4,224,545  9/1980  Powell ................................ 310/93

Primary Examiner—Donovan F. Duggan
Attorney, Agent, or Firm—Hugh D. Jaeger

[57] ABSTRACT

Motor, either synchronous or direct current, including at least one drive coil and including a magnetic rotor having at least two concentric rings of magnetic domains of alternating magnetic poles, with each succeeding rotor ring being of a larger diameter than the previous rotor ring. The drive coil is radially movable so as to be positioned over or adjacent to each of the rotor rings.

8 Claims, 10 Drawing Figures

MOTOR HAVING CONCENTRIC RING ROTOR

BACKGROUND OF THE INVENTION

1. Field of the Invention

The present invention relates to a motor, and more particularly, pertains to a motor having a concentric ring rotor with concentric rings of permanent magnets of alternating poles.

2. Description of the Prior Art

In synchronous motors, the motors are designed for a particular speed, and it is not possible to vary the speed of the motor. In DC motors, the speed of prior art motors has been changed by mechanical structure such as gears or pulleys, or electrical structure such as rheostats in the windings of the coils thereby causing a large loss of electrical energy dissipated in the form of heat through $I^2R$ losses. The adjustment of speed is of prime importance, especially in vehicles or in machinery where speed is of particular importance, such as testile mills, etc.

The present invention overcomes the disadvantages of the prior art motors by providing a motor having rotor of at least two concentric rings where each ring comprises a magnetic domain of alternating magnetic poles.

SUMMARY OF THE INVENTION

The purpose of the present invention is to provide a motor having a rotor of at least two concentric rings of magnetic domains of alternating magnetic poles where the concentric rings increase in diameter providing for operation of the motor at different speeds. The rings of magnetic domains are concentrically arranged on a circumferential plane with respect to each other.

According to one embodiment of the present invention, there is provided a motor including at least one drive coil and associated circuitry for synchronous mode of operation or a direct current mode of operation, and a rotor axially supported over or adjacent to the drive coil, the rotor including a plurality of rings of magnetic domains of alternating magnetic poles of increasing diameter, circumferentially spaced on the same plane whereby the drive coil is positioned over or adjacent to one of the plurality of rings of the rotor thereby driving the rotor axially supported on a shaft, and the speed is changed by positioning the drive coil over or adjacent to one of the rotor rings of different diameters and thereby changing the speed of the motor.

One significant aspect and feature of the present invention is the adjustment of the speed of the motor without loss associated with friction or without loss associated with electrical energy. Adjustment is purely a function of placement of the drive coil over or adjacent to one of the plurality of concentric rings of the rotor. No energy is lost through mechanical friction or electrical dissipation in changing the speed of the motor as in the prior art motors. Speed change is an easily accomplished mechanical function by radially changing the position of the drive coil with respect to the concentric rings of the rotor.

Another significant aspect and feature of the present invention is a rotor of a motor which axially supports a plurality of concentric rings about the drive shaft of the motor. The rotor which is securely affixed to the shaft of the motor provides for maximum transfer of energy to the work with no loss of energy between the rotor and the shaft of the motor.

A further significant aspect and feature of the present invention is a motor having a rotor with concentric rings where the rotor is capable of operation in either a synchronous mode of operation or in a direct current mode of operation by changing the drive coil structure.

An additional significant aspect and feature of the present invention is a brake coil which provides for coupling of braking energy in an electrical nature which can be substantially stored in an energy storage source such as a battery allowing for substantial recovery of energy during braking. There is minimal loss of braking energy which would otherwise be lost in the form of friction heat loss or $I^2R$ losses. What energy is lost is due to braking by the brake coil and is lost in the form of $I^2R$ losses in the braking coil. Substantially all of the energy can be stored in a storage battery during a braking or slowing situation with the braking coil, and later recovered for use to accelerate the velocity of the motor.

Having briefly described one embodiment of the present invention, it is a principle object thereof to provide a motor having a rotor with concentric rings of magnetic domains of alternating magnetic poles providing for varying speed of operation of the motor, and which can be operated in either a synchronous mode of operation or in a direct current mode of operation.

One object of the present invention is to provide a motor having a rotor with concentric rings of magnetic domains of alternating magnetic poles which provide for varying speed of operation of the motor as predetermined. As the circumference of the concentric rotor rings increases, the speed of the motor decreases and the torque of the motor increases. The number of concentric rotor rings is only dependent on the size of the rotor and on the size of each of the magnetic domains.

Another object of the present invention is a motor having a rotor with concentric rings of magnetic domains of alternating magnetic poles which is capable of either synchronous operation or direct current operation. In synchronous operation, the motor is driven by a drive coil of appropriate impedance.

In direct current operation, the motor is driven by a direct current drive coil of appropriate impedance having an auxiliary pickup coil with a switching transistor, magnetic switch, or like switching.

A further object of the present invention is a braking coil which positions over or adjacent to one of the concentric rings of the rotor to either slow the motor down or to bring the motor to a complete stop. The braking coil can either dissipate the energy such as in heat when connected to a light bulb or other resistive source, or to an energy storage source such as a storage battery in a vehicle application such as in an automobile for later recovery during acceleration of the motor. The braking coil can also be moved over or adjacent to the concentric rings of the rotor for providing for slowing of the motor or to bring the motor to a complete stop. Also, as the braking coil is moved over or adjacent to a concentric rotor ring, the drive coil is moved away from the concentric rotor ring preventing further loss of energy. In the alternative, the source of power can be disconnected from the drive coil which also provides a minimal amount of braking. Further, the source of power can be removed from the drive coil and the drive coil can be connected to the braking coil to utilize the back EMF in the two coils to brake the rotor for slowing or stopping the motor where the back EMF is connected to an energy storage source.

BRIEF DESCRIPTION OF THE DRAWING

Other objects and many of the attendant advantages of this invention will be readily appreciated as the same becomes better understood by reference to the following detailed description when considered in connection with the accompanying drawings, in which like reference numerals designate like elements throughout the figures thereof and wherein.

DESCRIPTION OF PREFERRED EMBODIMENTS

Figure 1:
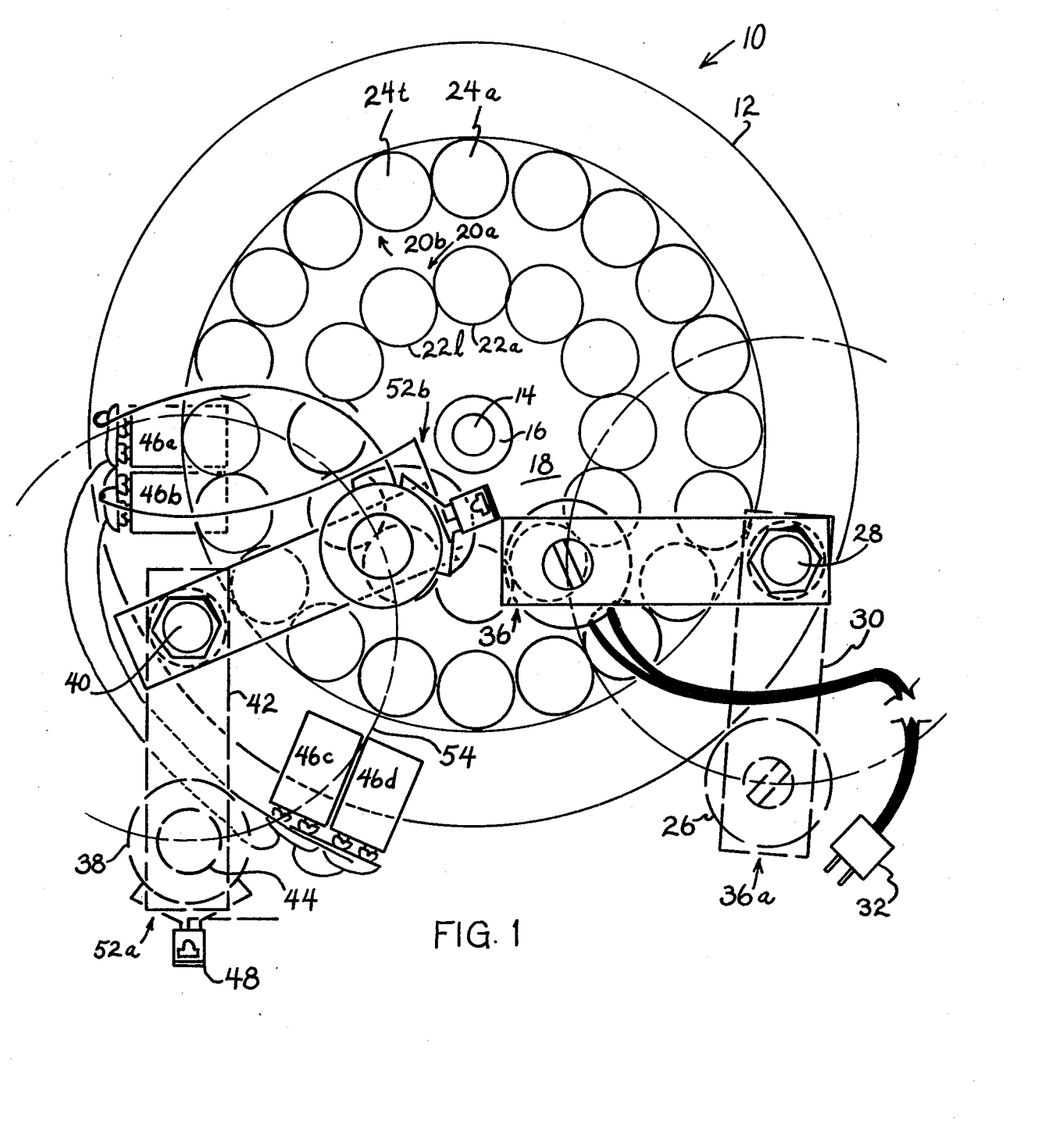
FIG. 1 illustrates a top plan view of a motor of the present invention.

FIG. 1, which illustrates a top plan view of a motor of the present invention, shows a motor 10 including a base member 12, an axial shaft 14 vertically secured to the base member 12 and supporting a bearing 16. A rotor support 18 which is illustrated as being circular, by way of example and for purposes of illustration only, is axially rotatably supported by the bearing 16 on the shaft 14. In the alternative, the rotor support 18 can be affixed to the shaft 14, and the shaft 14 can be axially supported in a suitable bearing.

Concentric inner ring rotor 20a and concentric outer ring rotor 20b are axially positioned about shaft 14 on the rotor support 18. The concentric inner and outer ring rotors 20a and 20b respectively comprise a plurality of magnetic domains of alternating magnetic poles, and in this instance, by way of example and for purposes of illustration only, comprise a plurality of permanent magnets of alternating magnetic poles positioned on an inner small diameter and an outer large diameter from shaft 14 respectively, and comprise the two circular concentric rings of the inner ring rotor and the outer ring rotor 20a and 20b respectively. The concentric inner ring rotor 20a in this embodiment comprises permanent magnets 22a–22l and the concentric outer ring rotor 20b comprises permanent magnets 24a through 24t. The poles of the permanent magnets 22a–22l and 24a–24t alternate with respect to each other; that is, plus, minus, plus, minus, etc. While two concentric rings have been shown, by way of example and for purposes of illustration only, the number of rings or number of magnetic domains is not to be construed as limiting of the present invention. Any number of concentric rings can be positioned on rotor support 18 and the number of concentric rings is only limited by the size of each magnetic domain and the diameter of rotor support 18. Also, while concentric ring rotors 20a and 20b have been disclosed as comprising permanent magnets 22a–22l and 24a–24t, rotor support 18 and concentric rings 20a and 20b of the disclosed embodiment of permanent magnets can assume other alternative embodiments such as a rotor of magnetizable ferromagnetic or like material with the magnetic domains positioned in the material so as not to form a plurality of concentric rings, but also in each ring a plurality of alternating magnetic domains, thereby yielding a rotor of one piece of material including a plurality of concentric rings, each of the concentric rings having a plurality of alternating magnetic domains. Another alternative embodiment would be a plurality of ring magnet doughnut-shaped rings, and of different diameters positioned either secured through a rotor support 18 or bearingly affixed directly to the bearing 16 absent the rotor support 18 and engaged within each other.

Figure 2:
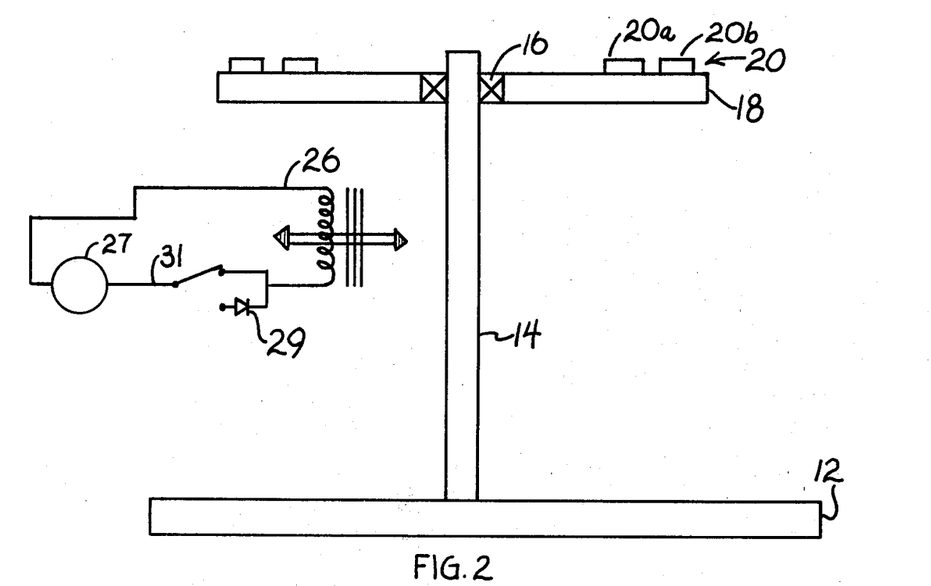
FIG. 2 illustrates an electrical circuit schematic diagram for synchronous motor drive of the motor of FIG. 1.

Synchronous drive coil 26 in one embodiment drives the rotor 20 including ring rotors 20a and 20b. A shaft 28 secures to the base 12 and axially supports a single bar linkage 30 rotatably mounted thereto. Synchronous drive coil 26, rotatably secured to linkage 30, connects to an alternating current source of power 32, through a line cord as later described in FIG. 2. The synchronous drive coil 26 axially rotates on a circumferential radius 34 so that the synchronous drive coil 26 passes over and adjacent to the magnetic domains of the inner and outer ring rotors 20a and 20b. Linkage 30 can either be moved manually or through a servo feedback control mechanism coupled to a speed-indicating measuring instrument as predetermined. The synchronous drive coil 26 is illustrated in a rest position 36a and in an active position 36b along circumferential radial line 34 over or adjacent to the ring rotors 20. The synchronous drive coil 26 can be stacked for increased power of the rotor 20 as later described in FIG. 8. FIG. 2 describes the electrical circuit in detail.

Direct current drive coil 38 secures to a single bar linkage 42 which is axially supported on a shaft 40 as previously described for the synchronous drive coil 26. A pickup coil 44 mounts above the drive coil 38 and connects to a switching transistor 48. A source of power such as a rechargeable energy source such as a nicad battery or nine-volt transistor batteries in parallel 46a through 46d mounts on the base 12 and connects to drive coil 38 through the switching transistor 48. The electrical schematic circuit diagram of the direct current drive coil 38 and associated circuitry is later described in FIG. 3. The direct current drive coil 38 is illustrated in a rest position 52a and in an active position 52b where the direct current drive coil axially rotates about a circumferential line 54 over or adjacent to the ring rotors 20.

FIG. 2 illustrates an electrical circuit schematic diagram for the synchronous drive coil 26 of the motor 10 of the present invention. The drive coil 26 can connect either to a power source 27 of AC power or, in the alternative, to a source of pulsed direct current such as by placing a diode 29 in series between the drive coil and the power source 27 with switch 31. The diode 29 in series with the drive coil 26 when connected to an AC source 27 would result in pulsed direct current resulting in one-half torque and one-half power with respect to AC power. A pulsed DC source of power would also control torque and power dependent on the width period, and height of the pulse. The total power output is proportioned to the integral of the voltage and current of the pulse with respect to time.

Figure 3:
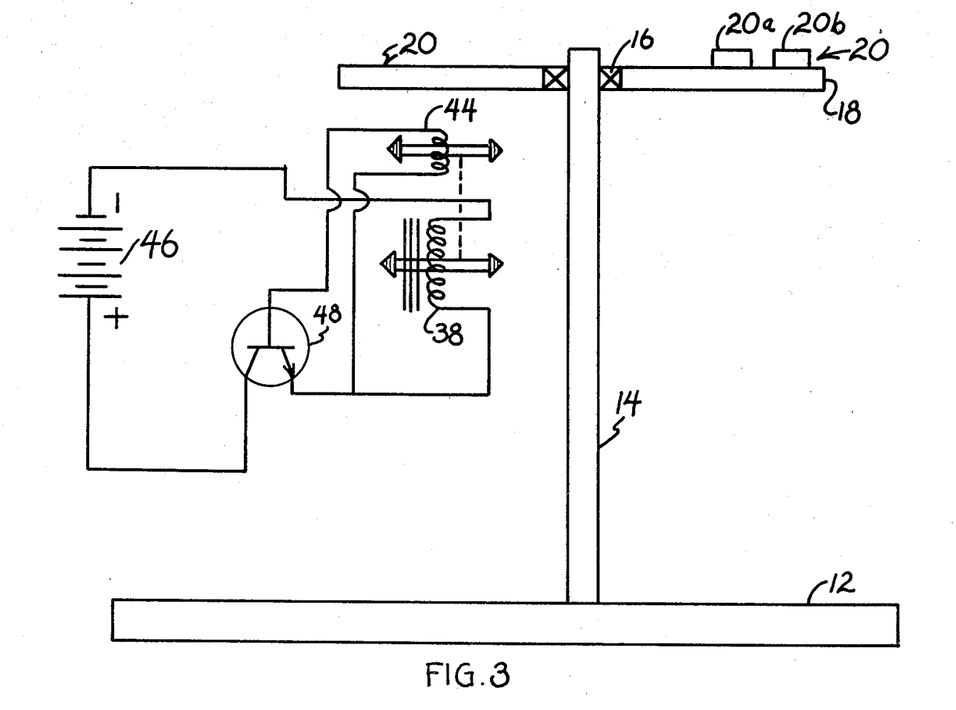
FIG. 3 illustrates an electrical circuit schematic of a direct current motor of FIG. 1.

FIG. 3 illustrates an electrical circuit schematic of the direct current drive coil 38 and associated circuitry of the motor 10 of the present invention as previously described. The drive coil 38 and phasing coil 44 move along radial circumference 54.

Figure 4:
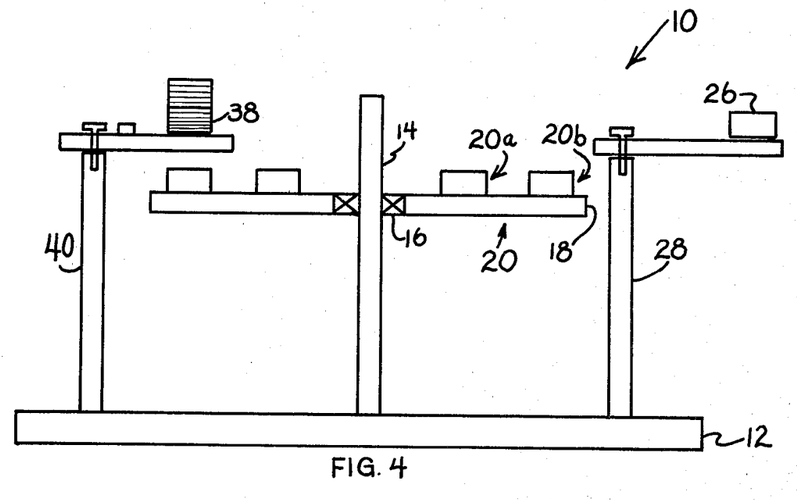
FIG. 4 illustrates a side view of the motor of FIG. 1.

FIG. 4 illustrates a side view of the base 12, shaft 14, bearing 16, rotor support 18, inner and outer circumferential ring rotors 20a and 20b on the rotor 20. Shafts 28 and 40 are further illustrated showing respective support of the synchronous drive coil 26 and direct current drive coil 38.

Figure 5:
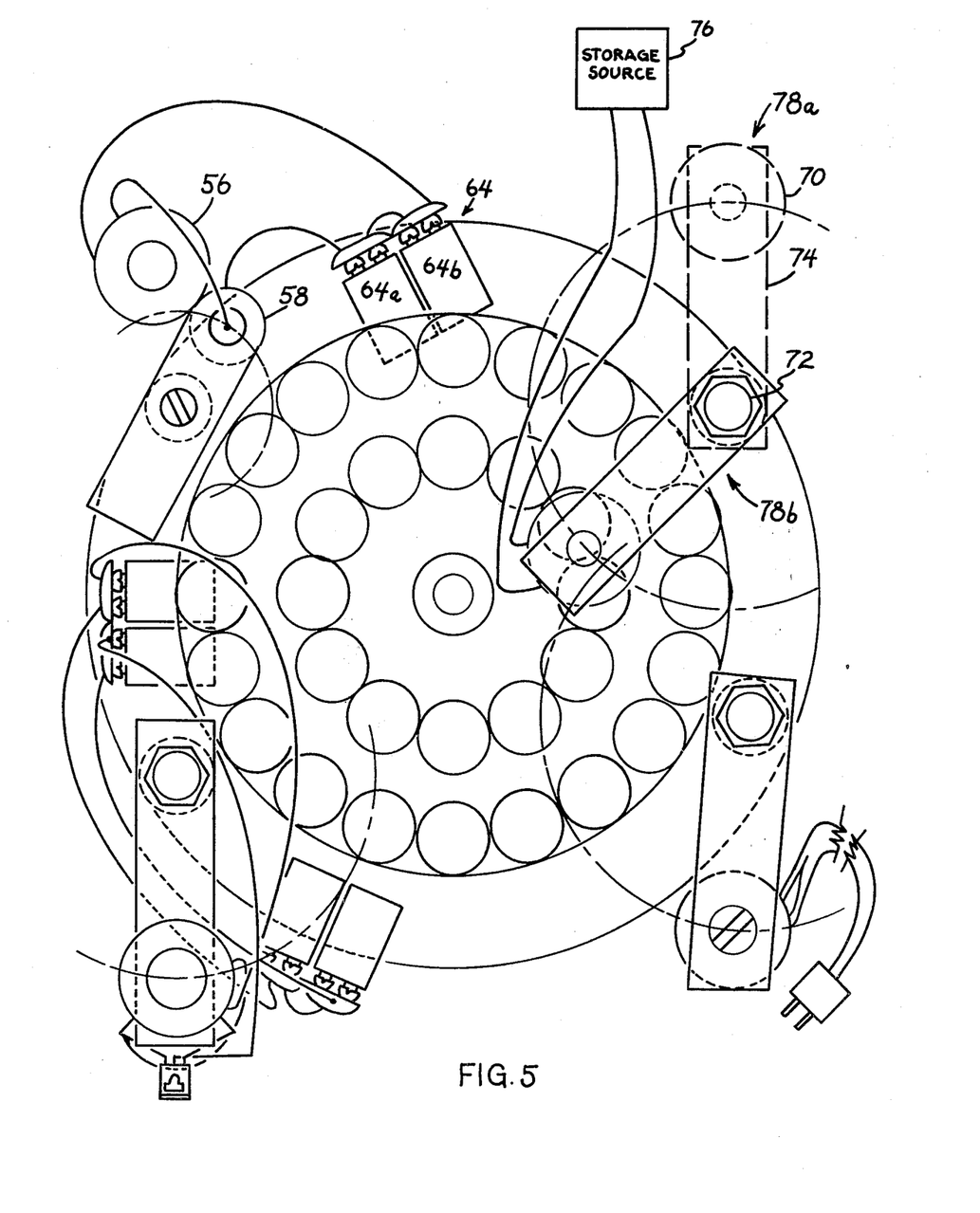
FIG. 5 illustrates a top plan view of additional motor structure.

FIG. 5 illustrates a top plan view of FIG. 1 where all numerals correspond to those elements previously described with the additional inclusion of a direct current drive coil 56 including a magnetic switch 58, and a braking coil 70. Direct current drive coil 56 and magnetic switch 58 are supported on a single bar linkage 62 which is axially rotatable about a shaft 60. A source of power 64 such as a rechargeable nicad battery or batteries 64a and 64b, by way of example and for purposes of illustration only, connects between magnetic switch 58 and drive coil 56. Magnetic switch 58 and direct current coil 56 axially rotate about a circumferential radial line 66 between a rest position 68a and an active drive position 68b over or adjacent to the rotor rings 20a and 20b.

The braking coil 70 is supported on a single bar linkage 74 which is axially rotatable on a shaft 72. A storage source 76 can connect to the braking coil 70 for substantially storing energy during the braking process at a resistive source for dissipating the energy, or to a servo feedback control for controlling the degree of braking. The energy storage source can be a battery.

Figure 6:
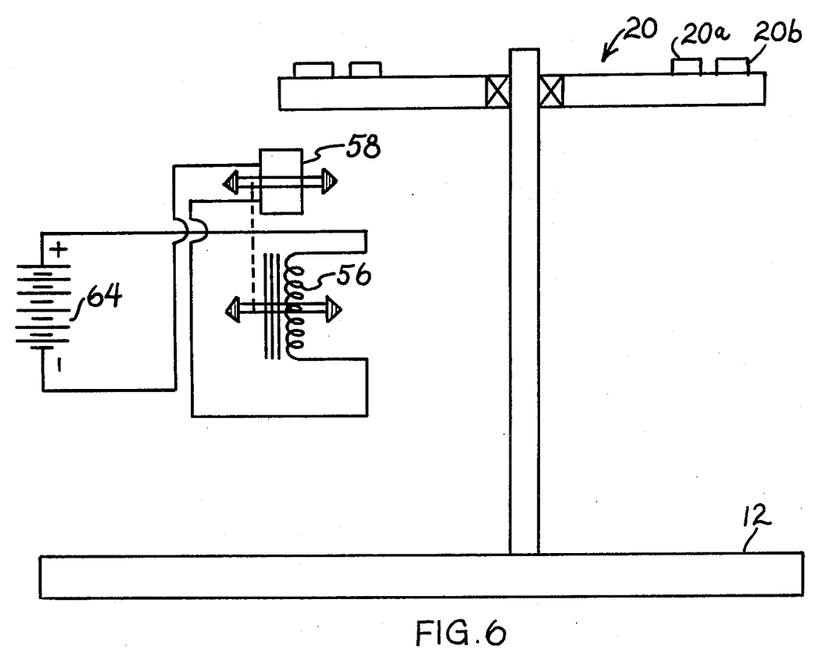
FIG. 6 illustrates an electrical circuit schematic diagram of a direct current drive coil with a magnetic switch.

FIG. 6 illustrates an electrical circuit schematic of the direct current drive coil 56 including the magnetic switch 58.

Figure 7:
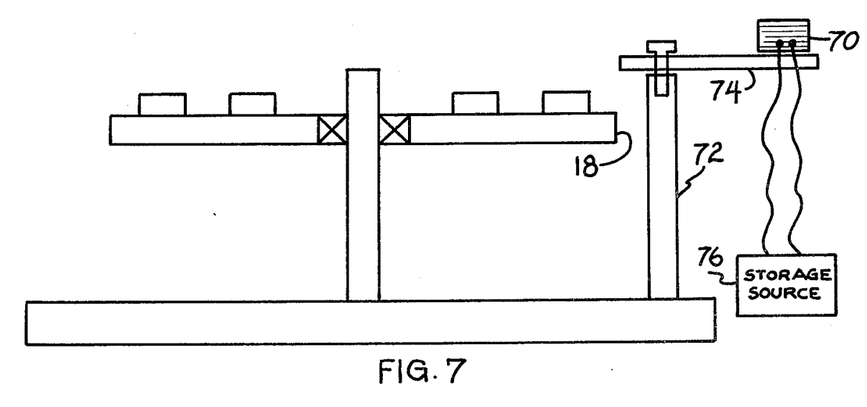
FIG. 7 illustrates an electrical circuit schematic of a braking coil connected to an energy storage source.

FIG. 7 illustrates an electrical circuit schematic of the braking coil 70 connected to the energy storage source 76.

PREFERRED MODE OF OPERATION

The motor 10 of the present invention particularly lends itself in applications such as a gearless and frictionless torque converter, a vehicular motor, or a synchronous motor requiring control of speed. The motor provides for the recovery of energy which would otherwise be lost due to friction or $I^2R$ losses, and substantially stores the energy during a braking period.

The concentric inner and outer ring rotors 20a and 20b provide for different degrees of speed and torque. Concentric inner ring rotor 20a has a faster speed but less torque than concentric outer ring rotor 20b which has a slower speed but greater torque. The power of rotor 20 of the motor 10 is a function of torque times speed. Speed is a function of the number of pairs of magnetic domains, the magnetic strength of each magnetic domain, and the type of drive coil such as impedance, magnetic force, and whether the drive coil is synchronous or direct current mode, either transistorized switching or magnetic switching. As previously described in the specification, the rotor 20 can have any number of concentric rings of different diameters, the number of rings being dependent upon the size of rotor support 18, the number of magnetic domains, the radius of the linkages for the respective drive coils and brake coil, and other design considerations.

Rotor 20 is driven to predetermined radial velocity either by the synchronous coil 26 or direct current coil 38 or 56, and is slowed by either of the drive coils when disconnected from the power source or by the brake coil 70 as now described.

When the motor is used in an environment lending itself to synchronous operation such as in a stationary environment as in a textile mill, etc. or adjacent to a source of alternating current, the motor is powered by the synchronous drive coil 26 by radially rotating the drive coil 26 over or adjacent to one of the concentric rings 20 about the shaft 28 on the bar linkage 30. The larger the diameter of the concentric ring 20, the slower the rotor 20 rotates, but with more torque. The closer to the center of the rotor the synchronous drive coil 26 moves, the faster the rotor 20 rotates but with less torque. Rotor 20 can either be started manually or suitable starting circuitry can be provided as later described.

The concentric ring rotor 20 rotates at a speed at which it is started and brought to its synchronous speed at which it locks into as designed in the synchronous mode of operation, and operates at any number of predetermined speeds with respect to the diameter of the concentric rotor rings, the number of alternating pairs of magnetic domains, and the frequency. Power of course is a function of speed and torque, and torque is a function of a number of variables. Speed is of course a function of frequency and number of pairs of magnetic domains. Uses include turntables having concentric ring motors in textile mills, etc. The concentric ring rotor has to be brought to the predetermined speed at which it locks into during operation.

In braking or slowing down the velocity of the rotor 20, the power can be disconnected from the synchronous drive coil 26 thereby slowing the rotor 20. The brake coil 70 can also be radially moved over or adjacent to the concentric ring rotors 20 thereby slowing the rotor 20. Also, the brake coil 70 can be connected to the synchronous drive coil 26 providing for a back EMF which will further decrease the velocity of rotor 20.

The braking or slowing of the rotor 20 by the brake coil 70 provides frictionless braking without brushes or commutators resulting in no friction, wear, sticking, high resistance, carbon loss or major rotor $I^2R$ losses. Further, by connecting the brake coil 70 to a storage source such as a battery, substantial energy can be stored which would otherwise be lost. Therefore it is possible to recover substantially most of the energy during braking which would otherwise be dissipated.

The direct current drive coil 38 which is switched by the switching transistor 48 operates on the principle that each time a magnetic domain passes the pickup coil 44, the transistor 48 is driven into conduction by the signal from the pickup coil 38 passing over each of the alternating magnetic domains of the rotor. The direct current drive coils 38 and 56 substantially lend themselves to use a vehicular applications 38 or 56 such as electric cars. Particularly, the direct current drive coils 38 or 56 are gearless and frictionless torque converter, resulting in no loss of energy when changing speed or changing torque. More importantly, during braking, energy which would otherwise be lost can be recovered and stored in a storage battery connected to the braking coil 70, resulting in recovery of substantial energy which would otherwise be lost in braking and which can be used for accelerating the rotor 20 which can be directly connected to the axle of the vehicle.

When the direct current coil 56 is used with magnetic switch 58, the magnetic switch 58 determines the frequency of conduction of the drive coil 56 as analogous to the switching transistor 48 determining conduction of the direct current drive coil 38.

DESCRIPTION OF ALTERNATIVE EMBODIMENT

Figure 8:
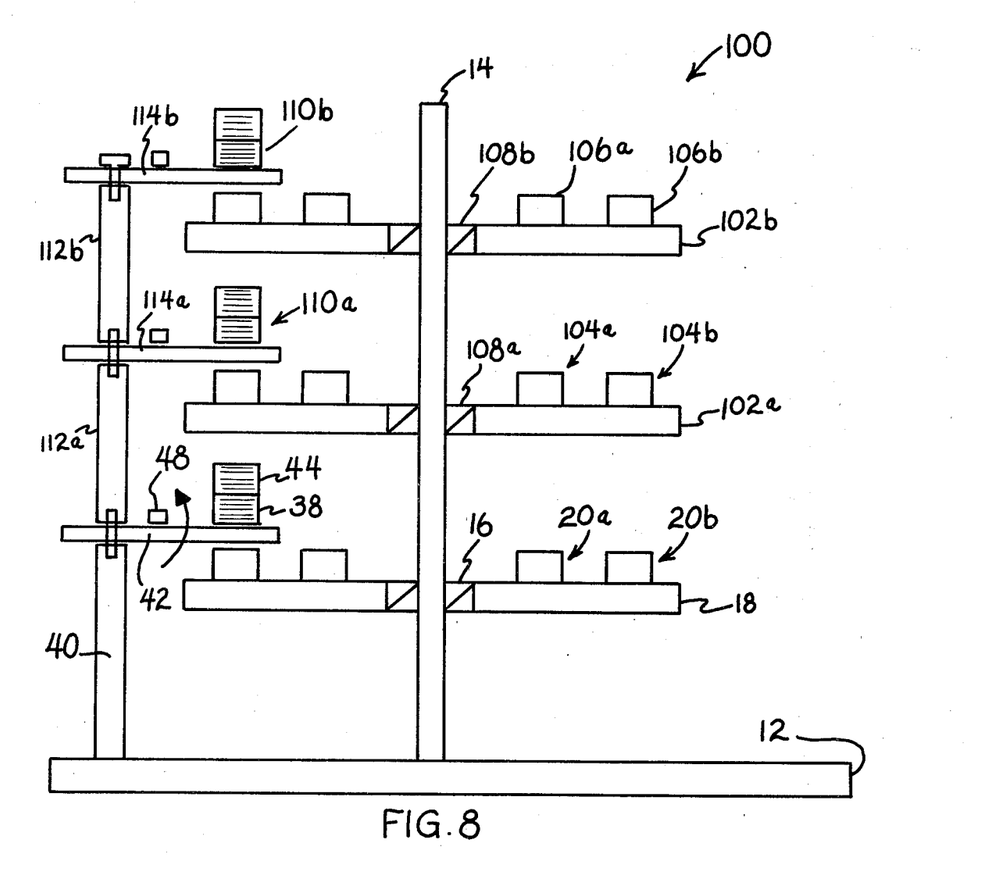
FIG. 8 illustrates a cross-sectional view of an alternative concentric ring rotor embodiment of stacked rotors for the motor of the present invention.

FIG. 8, which illustrates a cross-sectional view of an alternative motor embodiment 100 of a motor having concentric ring rotors, shows a base 12 supporting an axial shaft 14 including a rotor support 18 axially supported on bearing 16 as described in FIG. 1. The rotor support 18 includes concentric inner and outer ring rotors 20a and 20b as previously described. The ring rotor 18 can be driven by any one of the drive coil arrangements as previously described, and in this particular embodiment for purposes of illustration and example only, shows the direct current drive motor arrangement as previously described in FIGS. 1 and 3 driving the ring rotor 20.

Concentric ring motor embodiment 100 illustrates the inventive and novel structure 100 of stacking a plurality of rotors and drive coils for increased power of the motor. Concentric ring rotor supports 102a, 102b and any other stacked rotor supports as predetermined support a plurality of like concentric ring rotors 104a and 104b on support 102a, concentric rotors 106a and 106b on support 104b, and any other number of concentric ring rotors on rotor supports as so predetermined. Each of the rotor supports is axially positioned on the shaft 14 with suitable bearings 108a, 108b and as so predetermined or in the alternative, the rotor supports can be affixed to the shaft and the shaft can be supported in a bearing for rotation. A plurality of drive coils structures 110a and 110b and as so predetermined are positioned on shafts 40, 112a, 112b and as predetermined for supporting the drive coil structures over or adjacent to each of the concentric rings of each of the rotor supports.

PREFERRED MODE OF OPERATION OF ALTERNATIVE EMBODIMENT

Referring to FIG. 8, the bar linkages 114a and 114b can connect to a gear shift lever, through a servo feedback controlled electromechanical coupling or other like structure, and the plurality of drive coils 44 and 110 are simultaneously and in alignment positioned over the predetermined concentric ring rotor of the motor 100. The energy can either be separately coupled from each one of the rotor supports, or in the alternative, the rotor supports can be affixed to the shaft 14 where the shaft 14 rotates on the base and where the energy is coupled directly from the shaft 14.

DESCRIPTION OF FURTHER EMBODIMENT

Figure 9:
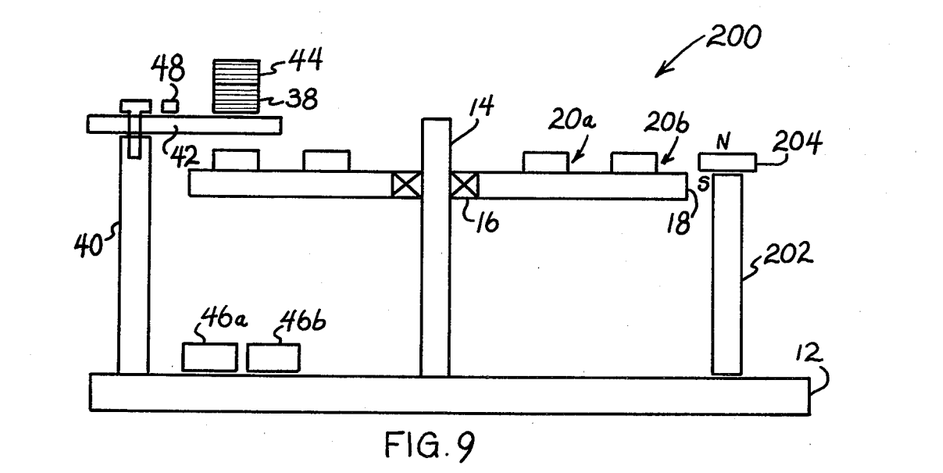
FIG. 9 illustrates a cross-sectional view of a starter for a magnetic rotor of the present invention.

FIG. 9, which illustrates a cross-sectional side view of a further embodiment of a starter 200 for a motor of the present invention, shows structure as described in the previous figures including the base 12, shaft 14, bearing 16, rotor support 18, concentric rings 20a and 20b, support 40, bar linkage 42, drive coil and phasing coils 38 and 44 respectively, switching transistor 48, and direct current power sources 46a and 46b. A positioning magnet 204 having north/south poles is affixed to and supported on a member 202 which is secured to the base 12. The positioning magnet 204 is located adjacent to the magnetic domains of the outer rotor ring 20b of the concentric ring rotor 20.

PREFERRED MODE OF OPERATION OF FURTHER EMBODIMENT

Figure 10:
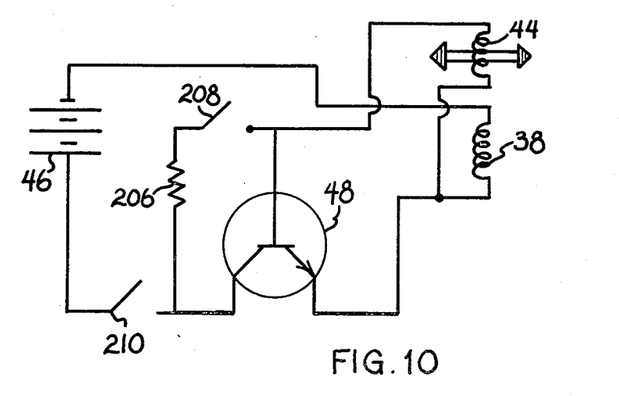
FIG. 10 illustrates an electrical circuit schematic of the starter of FIG. 9.

FIG. 10 illustrates an electrical circuit schematic diagram of the starter 200 of the motor having a rotor 78 of alternating magnetic domains. Switch 208 is a normally open momentary switch. Closing of switch 208 causes a continuous current flow through the drive coil 38 thereby starting the concentric ring rotor 20b on the rotor support 18 in axial motion clockwise or counterclockwise depending upon the position of positioning magnet 204 with respect to the magnetic domain of the rotor 20b of the concentric ring rotor 20. Once the rotor axially begins rotating, the switch 208 is released and the starting system is passive and consumes no power. The positioning magnet 204 and the phasing coil position 44 are both adjustable and variable in order to stop the rotor 20 at a predetermined position for subsequent starting and running the rotor 20 in the desired direction. The positioning magnet 204 always returns the rotor 20 to a start position and it is only necessary to return the phasing coil 44 including the drive coil 38 to a start position for starting axial rotation of the rotor 20. Switch 210 is an on/off switch for the motor.

Various modifications can be made to the present invention without departing from the apparent scope thereof. The number of concentric rings 20 on the rotor is only limited by the size of the rotor support itself and by the size of each of the magnetic domains. The rotor can include any number of rings and each ring can include any number of magnetic domains. The number of rotors which can be stacked is only limited by the space required for stacking a plurality of the rotors. The positioning magnet 204 can be used with any suitable rotor having any number of concentric rings and is not limited to the disclosed embodiment as described above. The positioning magnet 204 is particularly advantageous in a rotor having a single ring of alternating magnetic domains.

The motor including the concentric ring rotor particularly lends itself for utilization in a vehicle, especially automobiles, whether the automobile is all electric or a combination gas-electric vehicle. The motor including the concentric ring rotor also lends itself for utilization in vehicle configurations where the rotor support and concentric rotor rings form an integral part of one or more of the wheels such as in an automobile or a bicycle.

Having thus described the invention, what is claimed is:

1. Motor including a concentric ring rotor for use in a vehicle or other like mechanical, electrical or electromechanical structure, comprising:
   a. a rotor support axially and rotatably mounted on a first shaft, said first shaft secured to a frame means;
   b. a plurality of concentric ring rotors increasing from a smaller diameter to a larger diameter, a rotor support plate supporting each of said rotors, said plurality of rotors aligned on and stacked on said first shaft;
   c. a plurality of magnetic domains of alternating magnetic poles on each of said concentric ring rotors in increasing diameters, said plurality of magnetic domains including a plurality of members of magnetic material;

d. a means for braking each of said concentric ring rotors including a braking coil and a load means connected to each of said braking means and a linkage means including a one-bar pivotal linkage on a second shaft axially positioning said braking means over and adjacent to at least one of said concentric ring rotors about an arcuate position of said second shaft; and, e. a plurality of drive coil means axially aligned and mounted on a third shaft means including a one-bar pivotal linkage on said third shaft for arcuate rotation over and adjacent to each of said concentric rotor rings, said second and third shafts secured to said frame means whereby said drive coils are arcuately positioned over and adjacent to each of said concentric rotor rings thereby driving said concentric ring rotors on said shaft.

2. The motor of claim 1 comprising an energy storage means connected to said braking means for storing substantially all of said energy during braking in said energy storage means.

3. The motor of claim 1 wherein said energy storage means comprises a storage battery.

4. The motor of claim 1 wherein said drive coil means is synchronous.

5. The motor of claim 5 wherein said synchronous drive coil means connects to a source of alternating current power.

6. The motor of claim 5 wherein said synchronous drive coil means connects to said alternating current power source through a diode.

7. The motor of claim 5 wherein said synchronous drive coil means connects to a source of pulsed direct current power.

8. The motor of claim 5 wherein said drive coil means connects to a source of direct current power.

* * * * *